US011383996B2

(12) United States Patent
Wei et al.

(10) Patent No.: US 11,383,996 B2
(45) Date of Patent: Jul. 12, 2022

(54) INTEGRATED PHYSICAL METHOD OILY SEWAGE TREATMENT DEVICE

(71) Applicant: SHANDONG HYGIYA ENVIRONMENTAL PROTECTION EQUIPMENT CO., LTD., Zaozhuang (CN)

(72) Inventors: Liping Wei, Zaozhuang (CN); Hongyu Xu, Zaozhuang (CN); Huisheng Han, Zaozhuang (CN); Dongdong Zhang, Zaozhuang (CN); Rui Sun, Zaozhuang (CN); Hua Zhang, Zaozhuang (CN); Lingli Ren, Zaozhuang (CN); Liqing Wang, Zaozhuang (CN); Bao Liu, Zaozhuang (CN); Liqin Han, Zaozhuang (CN)

(73) Assignee: Shandong HYGIYA ENVIRONMENTAL PROTECTION EQUIPMENT CO. LTD., Shandong (CN)

( * ) Notice: Subject to any disclaimer, the term of this patent is extended or adjusted under 35 U.S.C. 154(b) by 411 days.

(21) Appl. No.: 16/468,291

(22) PCT Filed: Oct. 17, 2018

(86) PCT No.: PCT/CN2018/110569
§ 371 (c)(1),
(2) Date: Jun. 11, 2019

(87) PCT Pub. No.: WO2020/056819
PCT Pub. Date: Mar. 26, 2020

(65) Prior Publication Data

US 2021/0331959 A1 Oct. 28, 2021

(30) Foreign Application Priority Data

Sep. 20, 2018 (CN) ........................ 201811101078.7

(51) Int. Cl.
*C02F 9/00* (2006.01)
*B01D 17/02* (2006.01)
(Continued)

(52) U.S. Cl.
CPC ........... *C02F 9/00* (2013.01); *B01D 17/0205* (2013.01); *B01D 17/0211* (2013.01);
(Continued)

(58) Field of Classification Search
CPC ........................................................ C02F 9/00
See application file for complete search history.

(56) References Cited

U.S. PATENT DOCUMENTS 5,861,098 A * 1/1999 Morrison ............ B60C 15/0607 210/774
5,989,415 A * 11/1999 Hirs .................. B01D 17/0208 210/138

FOREIGN PATENT DOCUMENTS

CN 106745546 A * 5/2017 ............. C02F 1/463

* cited by examiner

*Primary Examiner* — Peter Keyworth

(57) ABSTRACT

The present invention discloses an oil-contained wastewater treatment apparatus applying the integrative physical methods. The wastewater treatment system of the invention may include a main tank, where the upper part is a rectangular body and the lower part is designed to a multi-bucket bottom structure. Two oil collection boxes are arranged to both outside ends of tank. A mud discharging outlet is attached to the bottom of the tank. Meanwhile, both of a water outlet and an electric polarizer are localized at the end face of the effluent on the tank. A power supply for the electro-adsorber is fixed to the inlet end on the top face of the tank. Divided by upper and lower deflectors, the inside of the tank is divided to three processing units, i.e., sludge-water separation unit, degradation-coalescence treatment unit, and sedimentation-electric polarization unit. Vortex centripetal gas (Continued)

flotation is applied to remove oil. Electro-adsorption induces the micelle clustering to achieve the decolorization. The electric polarization functions as anti-scaling, descaling, sterilization, and corrosion inhibition. Moreover, the referred physical treatment can be fulfilled in virtue of centrifugal force, buoyancy, gravity, adsorption force, coalescence force, inertia, shifting, and modification. Through the application of the system, the oil-contained wastewater can be treated environmentally friendly, safe and pollution-free. Besides the above advantages, high removal efficiency can make the apparatus and method a widely used approach on the oil-contained wastewater treatment.

6 Claims, 6 Drawing Sheets

(51) Int. Cl.
*B01D 17/04* (2006.01)
*B01D 17/06* (2006.01)
*C02F 1/24* (2006.01)
*C02F 1/40* (2006.01)
*C02F 1/46* (2006.01)
*C02F 11/127* (2019.01)
*C02F 1/00* (2006.01)
*C02F 101/32* (2006.01)
*C02F 103/10* (2006.01)

(52) U.S. Cl.
CPC ..... *B01D 17/0214* (2013.01); *B01D 17/0217* (2013.01); *B01D 17/045* (2013.01); *B01D 17/06* (2013.01); *C02F 1/24* (2013.01); *C02F 1/40* (2013.01); *C02F 1/46* (2013.01); *C02F 11/127* (2013.01); *C02F 2001/007* (2013.01); *C02F 2101/32* (2013.01); *C02F 2103/10* (2013.01)

INTEGRATED PHYSICAL METHOD OILY SEWAGE TREATMENT DEVICE

FIELD OF THE INVENTION

The invention generally relates to an integrated physical method oily sewage treatment device, especially an integrated physical treatment device for oil degreasing, glue gathering, decolorization, turbid descending, anti-scaling, descaling, sterilization and corrosion inhibition of oil containing sewage in oilfield.

BACKGROUND

At present, the treatment techniques of oil-containing wastewater in oil field, including degreasing, gathering, decolorization, turbidity, anti-scaling, descaling, sterilization, and corrosion inhibition, largely employ the combination of large tank settlement, high-efficiency separation device, multi-stage filtration device, and chemical adding processing. The processing shows multiple disadvantages, such as long processing term, large number and volume of devices, large area of land occupation, high engineering investment, and difficulties in management. In addition, the diversity of drugs and large doses levels up the operating cost. The large amount of formed sludge further increases the engineering investment and the operating cost in the subsequent processing.

In order to solve the mentioned problems, the inventors attempted to simplify the procedure of the oil-containing wastewater treatment by using a multi-functional continuous degreasing and decolorizing integrated treatment device (ZL201720133981.6). Although showing a simplified processing and good effect on oil-degreasing, micellar gathering and decoloration, several problems limited the wide application of the device. The design of the device focuses on the processing of oil-degreasing, micellar gathering and decoloration as well as the simplification of procedures, which make it difficult to collect oil during the treatment of liquid intake and lead to the generation of toxic and harmful gases ($Cl_2$, $H_2$) that become further environmental pollutions and new unsafe vulnerabilities.

SUMMARY OF THE INVENTION

To overcome the deficiencies in multi-functional continuous processing of oil-degreasing, micellar gathering and decoloration, the present invention provides a novel structure integrated physical method oily sewage treatment device. Applying an integrated physical method, the device can make the wastewater treatment simple, highly efficient and environmentally friendly. The device works through multiple physical processes, including centrifugal force, buoyancy, gravity, adsorption force, coalescence force, inertia, shifting, redirection, sedimentation, electrode scale prevention, electrode descaling, electrode sterilization and electrode corrosion inhibition. The device is easy to assemble and relocate by virtue of its small size and low weight. The device has many functions and costs only electric power and gas without adding any chemicals during the operation. The treatment effect is highly qualified, and the continuous operation can be ensured without shutdown for backwashing and cleaning up. In addition, there is no toxic and harmful gas produced. The safe and reliable use can satisfy the need of continuous treatment of oil-containing wastewater.

The following technical proposal is introduced, an integrated physical method oily sewage treatment device comprising: a main tank (2) installed on a support (1). The characters of the device comprise: the upper part of the main tank (2) is a rectangular body and the lower part is designed to a multi-bucket bottom structure. Two oil collection boxes (6) are arranged for both outside ends of the main tank (2), respectively. The bottom of the oil collection boxes is bucket shaped and followed by the oil receiving pipe. Sludge discharge outlets (12) are set at the bottom of the tank. A water outlet (3) and electro-polarizers (4) are installed at the lower part of the outlet end face of the main tank (2). An electro-adsorber power supply (7) is fixed at the inlet end and on the top face of the main tank (2). Divided by an upper deflector (16) and a lower deflector (17), the inside of the main tank (2) is compartmentalized to three processing units, i.e., a sludge-water separation unit, a degradation-coalescence treatment unit, and a sedimentation-electric polarization unit.

The sludge-water separation unit is consisted of a vortex centripetal gas flotation (15), electro-adsorbers (8) and a rotary oil skimmer (13) to fulfill the treatment function. The vortex centripetal gas flotation (15) contains a vortex gas flotation generator (23), an inlet pipe (10), a drain pipe (11) and a generator fixing support (22). The bottom, middle and upper part of the gas float generator (23) is a cone, a barrel, and a bucket, respectively, where the drain pipe (11) is equipped to the bottom of the cone. The inlet pipe (10) is equipped with the middle part of the gas float generator (23) and a gas filling port (9) is provided on the inlet pipe (10). The gas float generator (23) is fixed to the bottom of the tank through the generator in fixing support.

Each of electro-adsorbers (8) comprising electrode plates (24) and an electrode plate support (14), where the electrode plates (24) are fixed to the electrode plate support (14). The anode and cathode of the electrode plates (24) are the combination of a plate and an orifice plate. The anode and the cathode can be reversed by the electro-adsorber power supply (7). The four groups of electrode plate form into one set of electro-adsorber.

The rotary oil skimmer (13) comprising a hanging shaft (25) and a number of blades (26). The hanging shaft (25) suspends from the top of the tank. The blades (26) are bolted to the lower end of the hanging shaft.

The degradation-coalescence treatment unit comprising a lower deflector (16), an upper deflector (17), a lower sieve support (18), a lower sieve plate (27), a degraded filler (19), a coalescing filler (20) and an upper sieve plate (28). The upper sieve plate (28) is disposed on an upper surface between the lower deflector (16) and the upper deflector (17), and the lower sieve support (18) is disposed on a lower surface between the lower deflector (16) and the upper deflector (17). The lower sieve plate (27) is set below the lower sieve plate support (18). The degraded filler (19) is equipped to the lower sieve plate (27), where the coalescing filler (20) is located on top of the degraded filler (19). Sintered aluminum-charcoal-iron active filler acts as the degradation filler (19) and the coalescing filler (20) is selected from corrosion-resistant and mildew-resistant polar animal hair.

The sedimentation-electric polarization unit comprising tank plates, bucket bottom plates, electro-polarizers (4), and an oil recycle weir plate, wherein the oil recycle weir plate comprises two weir plates. The small box plate at both ends of the main tank (2) and the oil collection box (6) is shared plates, which are large weir plate of oil collection box. A small weir plate (29) is set to the top of the large weir plate. The upper part of the large weir plate is equipped with multiple positioning bolts. The main body of the small weir plate is equipped with several sliding grooves and the upper side of the small weir plate is provided with a dovetail groove. The small weir plate is localized and connected by the sliding groove and positioning bolts on the large weir plate, respectively.

The benefit of the invention is that the device functions through multiple physical processes, i.e., the vortex centripetal gas flotation to remove oil, the electro-adsorption to induce the micelle clustering to enforce the decolorization, and the electric polarization to function as anti-scaling, descaling, sterilization, and corrosion inhibition. In addition, the physical treatment is completed by the principles of centrifugal force, buoyancy, gravity, adsorption force, cohesion force, inertia, variable speed, direction change and settlement. The device is not only environmentally friendly, safe and pollution-free, but also has highly qualified treatment effect and manageable accessibility. It can be widely used in the treatment of oil-containing wastewater.

In the Figures: 1—support, 2—main tank, 3—water outlet, 4—electro-polarizer, 5—oil pipe, 6—oil collection boxes, 7—electro-adsorber power supply, 8—electro-adsorber, 9—gas filling port, 10—inlet pipe, 11—drain pipe, 12—sludge discharge outlet, 13—rotary oil skimmer, 14—electrode plate support, 15—vortex centripetal gas flotation, 16—lower deflector, 17—upper deflector, 18—lower sieve support, 19—degraded filler, 20—coalescing filler, 21—collecting pipe, 22—generator fixing support, 23—gas float generator, 24—electrode plate, 25—hanging shaft, 26—pulp sheet, 27—lower sieve plate, 28—upper sieve plate, and 29—small weir plate.

DETAILED DESCRIPTION OF THE PREFERRED EMBODIMENTS

The technical solutions to the embodiments of the present invention are clear and completely described below accompanied by the attached graphics in the embodiments of the present invention.

Figure 1:
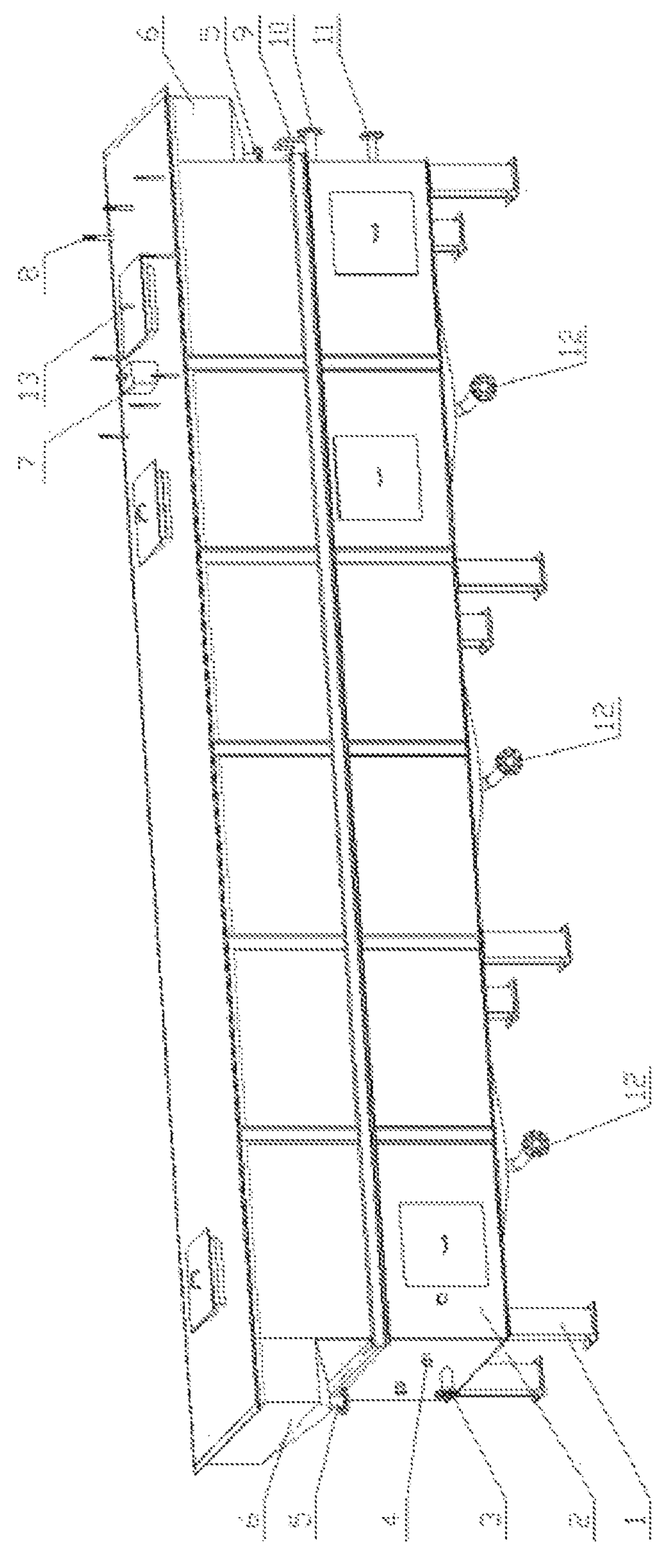
FIG. 1 is a perspective assembled view of the invention.
Figure 2:
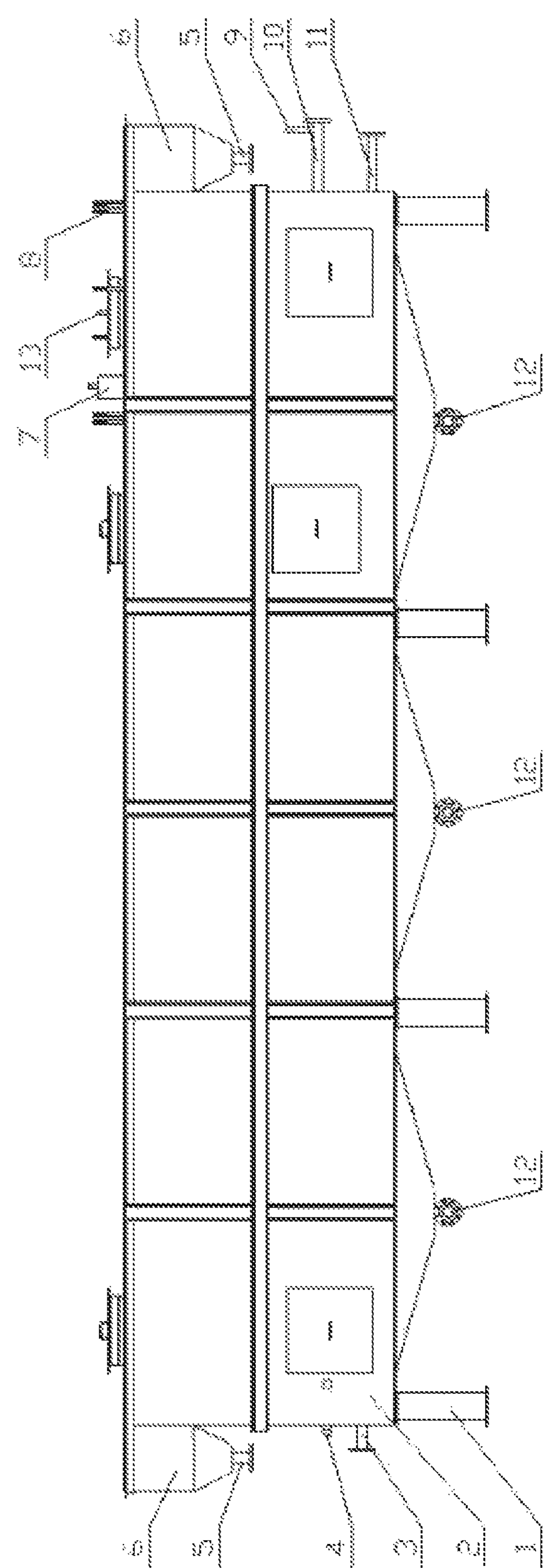
FIG. 2 is a front view of the invention.
Figure 3:
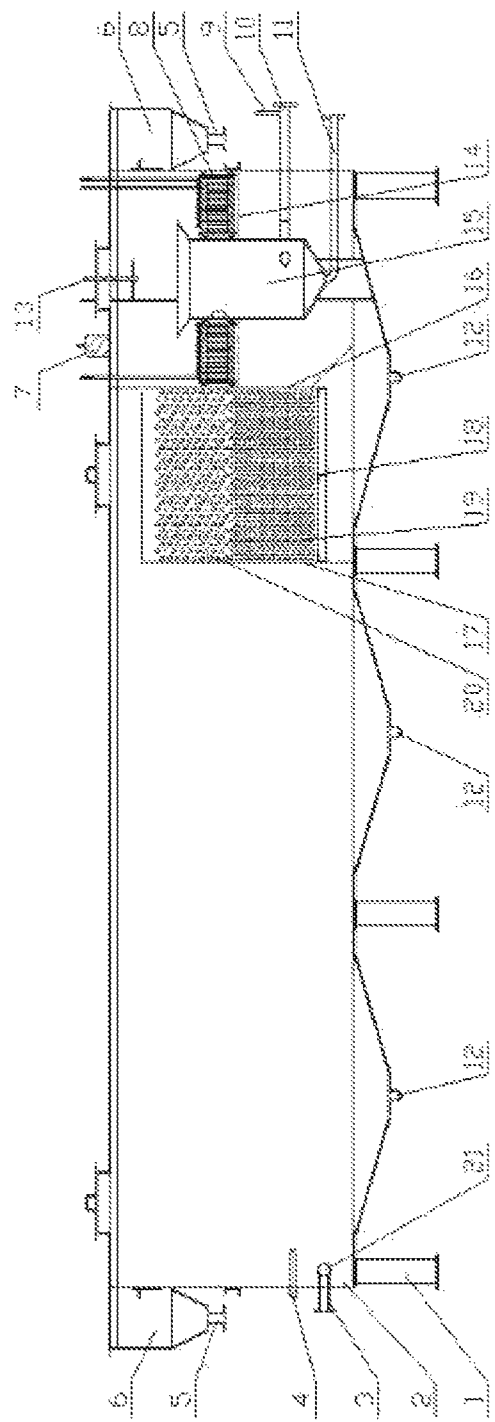
FIG. 3 is a longitudinal sectional view of the invention.
Figure 4:
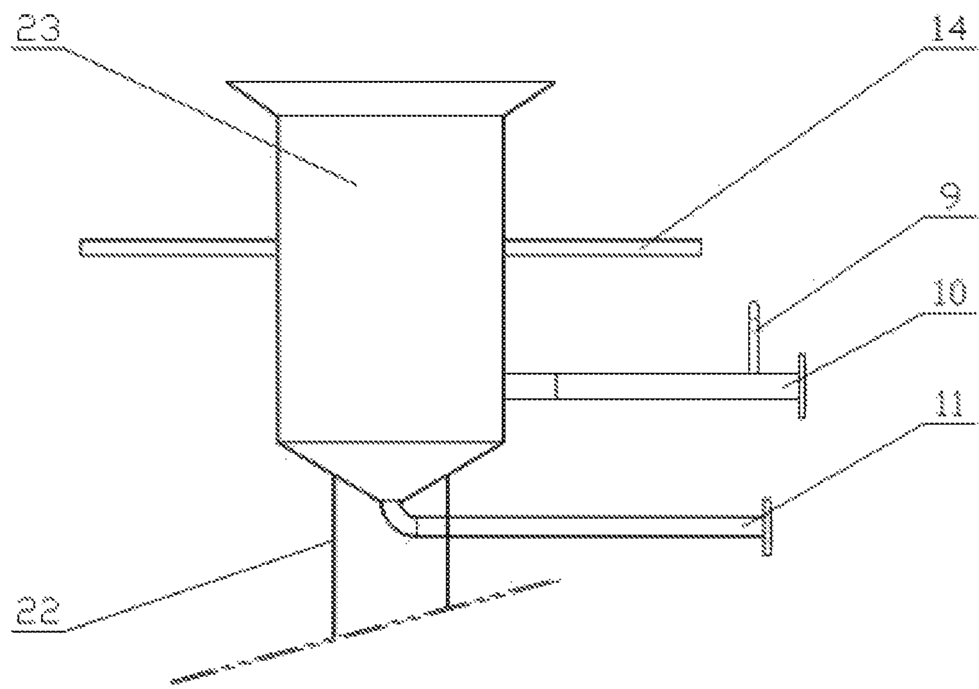
FIG. 4 is a combination diagram of a vortex centripetal air float.
Figure 5:
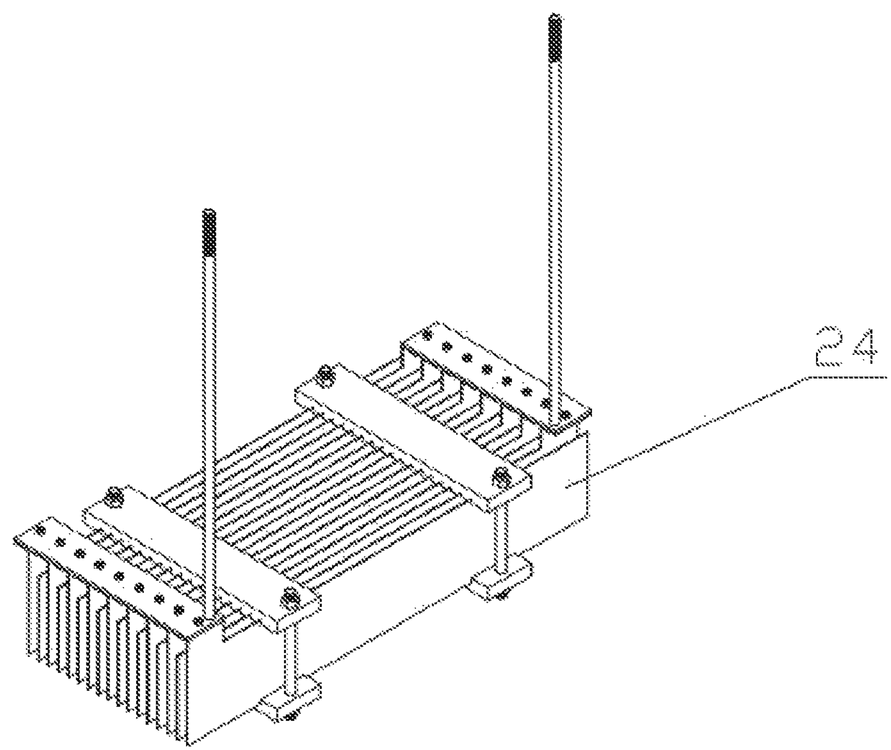
FIG. 5 is a combination diagram of an electric adsorber.
Figure 6:
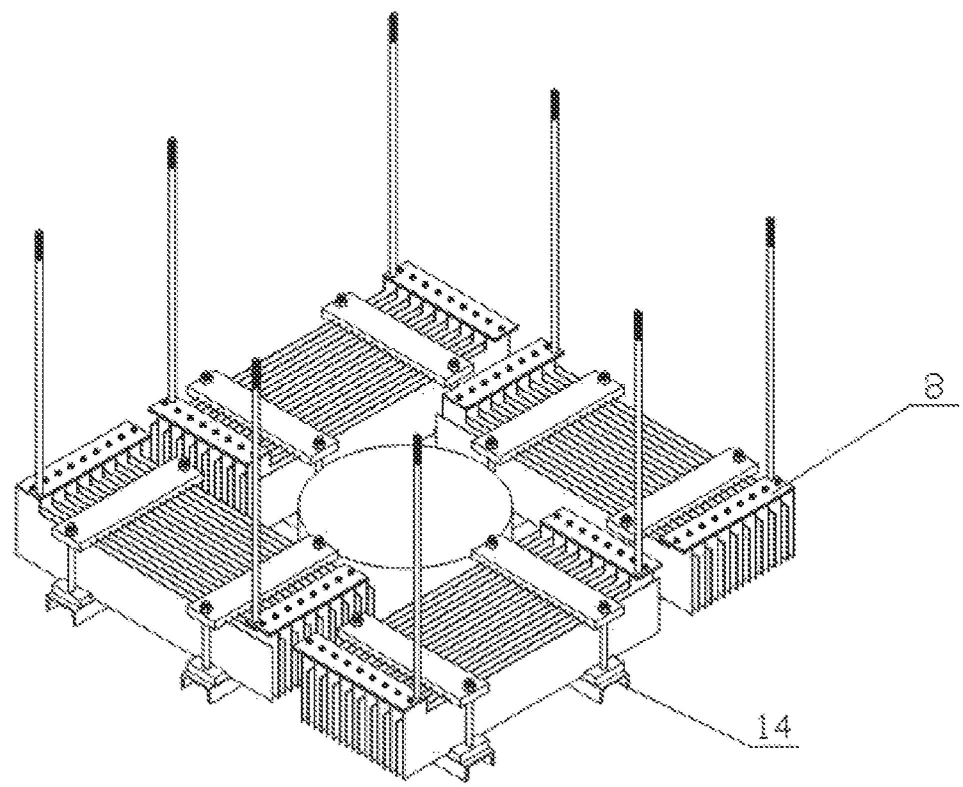
FIG. 6 is an installation diagram of the electric adsorber.
Figure 7:
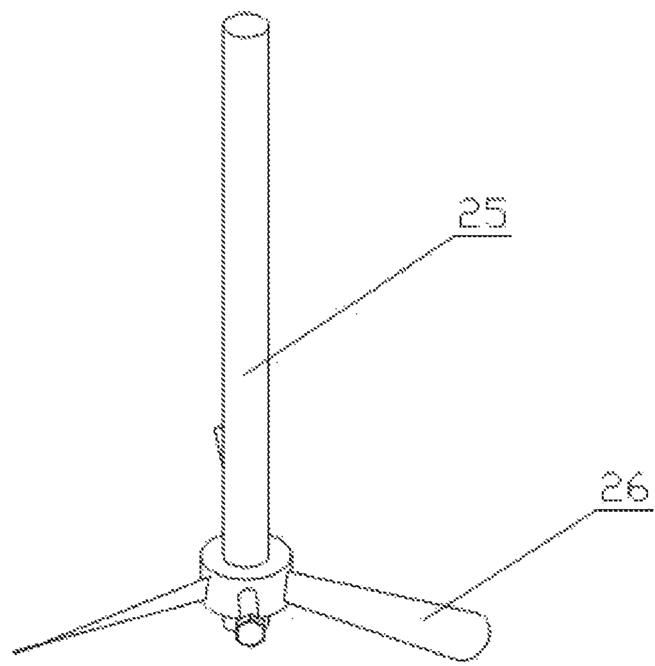
FIG. 7 is a combination diagram of a rotary oil skimmer.
Figure 8:
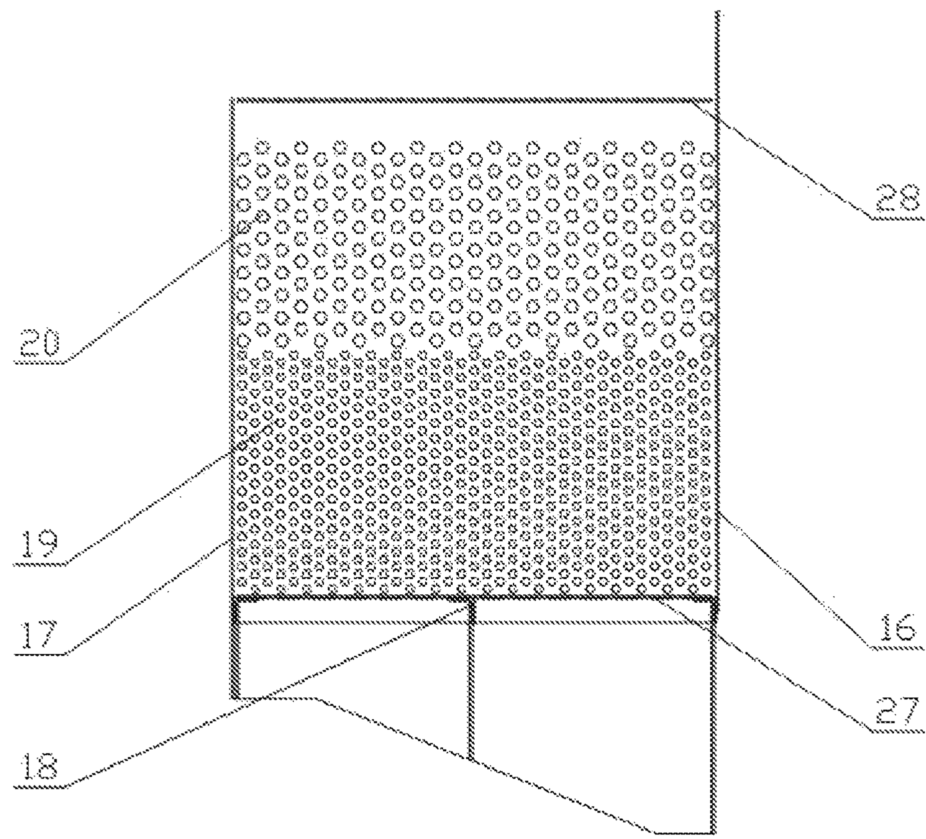
FIG. 8 is a sectional view showing the combination of degradation and coalescence unit.
Figure 9:
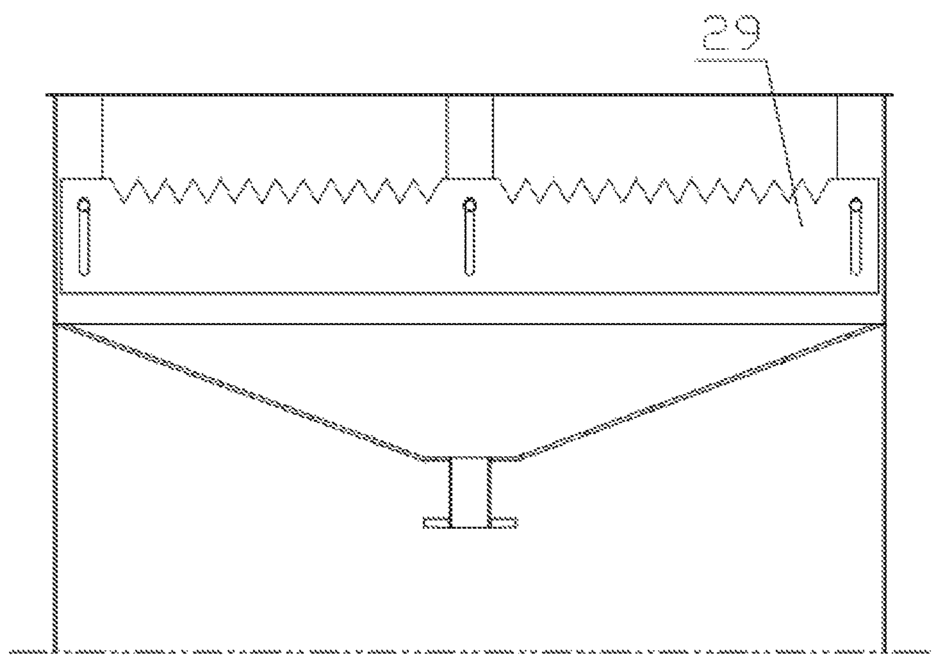
FIG. 9 is a combination diagram of the oil returning raft.

As shown in FIGS. 1-9, an integrated physical method oily sewage treatment device comprising: a main tank (2) installed on a support (1), wherein the upper part of the main tank (2) is a rectangular body and the lower part is designed to a multi-bucket bottom structure. Two oil collection boxes (6) are arranged on both outside ends of the main tank (2). Sludge discharge outlets (12) are set at the bottom of the tank. A water outlet (3) and electro-polarizers (4) are installed at the lower part of the outlet end face of the main tank (2). An electro-adsorber power supply (7) is fixed at the inlet end and on the top face of the main tank (2). Divided by an upper deflector (16) and a lower deflector (17), the inside of the main tank (2) is compartmentalized to three processing units, i.e., a sludge-water separation unit, a degradation-coalescence treatment unit, and a sedimentation-electric polarization unit.

The sludge-water separation unit is consisted of a vortex centripetal gas flotation (15), electro-adsorbers (8) and a rotary oil skimmer (13) to fulfill the treatment. The vortex centripetal gas flotation (15) contains a vortex gas flotation generator (23), an inlet pipe (10), a drain pipe (11) and a generator fixing support (22). The bottom, middle and upper part of a gas float generator (23) is a cone, a barrel, and a bucket, respectively, where a drain pipe (11) is equipped to the bottom of the cone. An inlet pipe (10) is equipped with the middle part of the gas float generator (23) and a gas filling port (9) is provided on the inlet pipe (10). The gas float generator (23) is fixed to the bottom of the tank through the generator in fixing support.

Each of electro-adsorbers (8) comprising electrode plates (24) and an electrode plate support (14), where the electrode plates (24) are fixed to the electrode plate support (14). The anode and cathode of the electrode plates (24) are the combination of a plate and an orifice plate. The anode and the cathode can be reversed by an electro-adsorber power supply (7). The four groups of electrode plates (24) form into one set of electro-adsorber.

A rotary oil skimmer (13) comprising a hanging shaft (25) and a number of blades (26). A hanging shaft (25) suspends from the top of the tank. The blades (26) are bolted to the lower end of the hanging shaft.

The degradation-coalescence treatment unit comprising a lower deflector (16), an upper deflector (17), a lower sieve support (18), a lower sieve plate (27), a degraded filler (19), a coalescing filler (20) and an upper sieve plate (28). The upper sieve plate (28) is disposed on an upper surface between the lower deflector (16) and the upper deflector (17), and the lower sieve support (18) is disposed on a lower surface between the lower deflector (16) and the upper deflector (17). The lower sieve plate (27) is set below the lower sieve plate support (18). The degraded filler (19) is equipped to the lower sieve plate (27), where the coalescing filler (20) is located on top of the degraded filler (19). Sintered aluminum-charcoal-iron active filler acts as the degradation filler (19) and the coalescing filler (20) is selected from corrosion-resistant and mildew-resistant polar animal hair.

The sedimentation-electric polarization unit comprising tank plates, bucket bottom plates, electro-polarizers (4), and an oil recycle weir plate, wherein the oil recycle weir plate comprises two weir plates. The small box plate at both ends of the main tank (2) and two oil collection boxes (6) are shared plates, which is also the large weir plate of oil collection boxes. A small weir plate (29) is set to the top of the large weir plate. The upper part of the large weir plate is equipped with multiple positioning bolts. The main body of the small weir plate is equipped with several sliding grooves while the upper side of the small weir plate is provided with a dovetail groove. The small weir plate is localized and connected by the sliding groove and positioning bolts on the large weir plate, respectively.

The mode of operation in the embodiments of the present invention comprises: the wastewater is lifted or self-pressed into the inlet of the main tank. After dissolving the gas, the wastewater enters the vortex centripetal gas flotation generator through the inlet pipe. The liquid runs upwards in an eddy current. The centrifugal force is generated through the rotation and the redirection. The buoyancy of dissolved airs and the gravity act synergistically to separate the oil, sludge and wastewater. The separated oil floats up and is sucked into the collection boxes by the rotary oil skimmer. The separated sludge is continuously discharged from the lower sludge discharge pipe. The separated wastewater is simultaneously redirected downward into the electro-adsorbers for the adsorption and coalescence of the polar substances. The agglomerates are dissolved into the water through the electrode reversing and then the pollutants are settled to the bottom of the tank by gravity and inertia generated by secondary speed change and direction change. After the sedimentation, the water flows upward through the lower screen and enters the degradation filler for the ionic depolarization, degradation, and decolorization treatment. The produced water flows into the coalescing filler to re-agglomerating the remaining polar matter. The separated water passes through the upper sieve plate and is redirected into the sedimentation-electric polarization unit. In the sedimentation-electric polarization unit, the water is first settled and then treated with the electric polarization anti-scaling, descaling, sterilization, and corrosion inhibition. The water finally exhausts from the outlet. The oil can be leveled up to settle out into the oil tank at regular intervals, thereby completing a physical cycle.

The above statement is a preferred embodiment of the present invention. Any changes, modifications, substitution and variations of the embodiment from those of ordinary skill in this field also belongs to the scope of protection of the invention if based on the instruction of the invention and without departing from the principles and spirit of the invention.

The invention claimed is:

1. An integrated physical method oily sewage treatment device comprising a main tank (2), the main tank (2) is mounted on a support (1), wherein the upper part of the main tank (2) is a rectangular body and the lower part is designed to a multi-bucket bottom structure, two oil collection boxes (6) are arranged for both outside ends of the main tank (2), respectively; sludge discharge outlets (12) are set at the bottom of the main tank (2), a water outlet (3) and electro-polarizers (4) are installed at the lower part of an outlet end face of the main tank (2), an electro-adsorber power supply (7) is fixed at an inlet end on a top face of the main tank (2); divided by an upper deflector (17) and a lower deflector (16), the inside of the main tank (2) is compartmentalized to three processing units, a sludge-water separation unit, a degradation-coalescence treatment unit, and a sedimentation-electric polarization unit;

wherein the degradation-coalescence treatment unit comprising the lower deflector (16), the upper deflector (17), a lower sieve support (18), a lower sieve plate (27), a degraded filler (19), a coalescing filler (20) and an upper sieve plate (28); said upper sieve plate (28) is disposed on an upper surface between the lower deflector (16) and the upper deflector (17), and the lower sieve support (18) is disposed on a lower surface between the lower deflector (16) and the upper deflector (17); the lower sieve plate (27) is set below the lower sieve support (18), the degraded filler (19) is equipped to the lower sieve plate (27), where the coalescing filler (20) is located on top of the degraded filler (19), sintered aluminum-charcoal-iron active filler acts as the degradation filler (19) and the coalescing filler (20) is selected from corrosion-resistant and mildew-resistant polar animal hair.

2. A device according to claim 1, wherein the sludge-water separation unit comprising a vortex centripetal gas flotation (15), electro-adsorbers (8) and a rotary oil skimmer (13) to fulfill the demand of wastewater treatment; the vortex centripetal gas flotation (15) contains a vortex gas flotation generator (23), an inlet pipe (10), a drain pipe (11) and a generator fixing support (22), the bottom, middle and upper part of the gas float generator (23) is designed for a cone, a barrel, and a bucket, respectively, where the drain pipe (11) is equipped to the bottom of the cone, the inlet pipe (10) is equipped with the middle part of the gas float generator (23) and a gas filling port (9) is provided on the inlet pipe (10); the gas float generator (23) is fixed to the bottom of the tank through the generator fixing support (22).

3. A device according to claim 2, wherein each of the electro-adsorbers (8) comprising electrode plates (24) and an electrode plate support (14), where the electrode plates (24) is fixed to the electrode plate support (14); an anode and a cathode of the electrode plates (24) are the combination of a plate and an orifice plate, the anode and the cathode can be reversed by the electro-adsorber power supply (7), each electro-adsorber includes four groups of electrode plates (24).

4. A device according to claim 2, wherein the rotary oil skimmer (13) comprising a hanging shaft (25) and a number of blades (26), the hanging shaft (25) suspends from the top of the tank, the blades (26) are bolted to the lower end of the hanging shaft.

5. A device according to claim 1, wherein the sedimentation-electric polarization unit comprising tank plates, bucket bottom plates, electro-polarizers (4), and an oil recycle weir plate, where the oil recycle weir plate comprising two weir plates, small box plates at both ends of the main tank (2) and the two oil collection boxes (6) are shared plates, a large weir plate of oil collection box; a small weir plate (29) is set to the top of the large weir plate; the upper part of the large weir plate is equipped with multiple positioning bolts, the main body of the small weir plate is equipped with several sliding grooves and the upper side of the small weir plate is provided with a dovetail groove, the small weir plate is localized and connected by the sliding groove and positioning bolts on the large weir plate, respectively.

6. A device according to claim 1, wherein the shape of the bottom of the two oil collection boxes (6) is a rectangle, which is equipped with an oil pipe (5).

* * * * *